US007207082B2

United States Patent
Lee

(10) Patent No.: US 7,207,082 B2
(45) Date of Patent: Apr. 24, 2007

(54) WINDSHIELD WIPER FRAME CONNECTOR WHICH ACCOMMODATES DIFFERENT SIZE WIPER ARMS

(76) Inventor: Albert Lee, 510 E. Preston St., Baltimore, MD (US) 21202

( * ) Notice: Subject to any disclaimer, the term of this patent is extended or adjusted under 35 U.S.C. 154(b) by 160 days.

(21) Appl. No.: 10/329,398

(22) Filed: Dec. 27, 2002

(65) Prior Publication Data

US 2004/0123414 A1    Jul. 1, 2004

(51) Int. Cl.
*B60S 1/40* (2006.01)
(52) U.S. Cl. .................................. 15/250.32
(58) Field of Classification Search ............. 15/250.32, 15/250.44, 250.43, 250.351; 403/321, 326, 403/329, 4
See application file for complete search history.

(56) References Cited

U.S. PATENT DOCUMENTS

| 3,425,089 | A | | 2/1969 | Quinlan et al. | |
|---|---|---|---|---|---|
| 3,780,395 | A | | 12/1973 | Quinlan et al. | |
| 5,084,933 | A | * | 2/1992 | Buechele | 15/250.32 |
| 5,289,608 | A | | 3/1994 | Kim | |
| D353,358 | S | | 12/1994 | Lee | |
| 5,392,487 | A | * | 2/1995 | Yang | 15/250.32 |
| D357,891 | S | | 5/1995 | Lee | |
| 5,606,765 | A | * | 3/1997 | Ding | 15/250.32 |
| 5,611,103 | A | | 3/1997 | Lee | |
| 5,632,059 | A | | 5/1997 | Lee | |
| D402,254 | S | | 12/1998 | Lee | |
| 5,885,023 | A | * | 3/1999 | Witek et al. | 403/321 |
| D411,503 | S | | 6/1999 | Lee | |
| 6,353,962 | B1 | * | 3/2002 | Matsumoto et al. | 15/250.32 |
| 6,779,223 | B1 | * | 8/2004 | Roekens | 15/250.32 |
| 2002/0174505 | A1 | * | 11/2002 | Kim | 15/250.32 |

FOREIGN PATENT DOCUMENTS

DE    2421378    * 12/1974
WO    01-15946    * 3/2001

* cited by examiner

*Primary Examiner*—Gary K. Graham
(74) *Attorney, Agent, or Firm*—Birch, Stewart, Kolasch and Birch, LLP

(57) ABSTRACT

A windshield wiper frame connector for connecting a wiper blade unit to a wiper arm inclues an elongated body member defining a longitudinal axis therealong. The body member has a pair of opposing sidewalls defining opposing inner surfaces. A connecting slot is disposed in a lower portion of the body member for rotatably receiving a transverse pin of a wiper blade unit. A hole is formed in each of the pair of opposing side walls for rotatably receiving a pin of a pin type wiper arm. An upper jam portion is disposed on a top portion of the body member for tightly and smoothly receiving a hook type wiper member. At least one space is disposed in the body member for tightly receiving outer surfaces of a first hook type wiper arm. Furthermore, a pivotable lever is provided for removably engaging the pin of the pin type wiper arm.

8 Claims, 14 Drawing Sheets

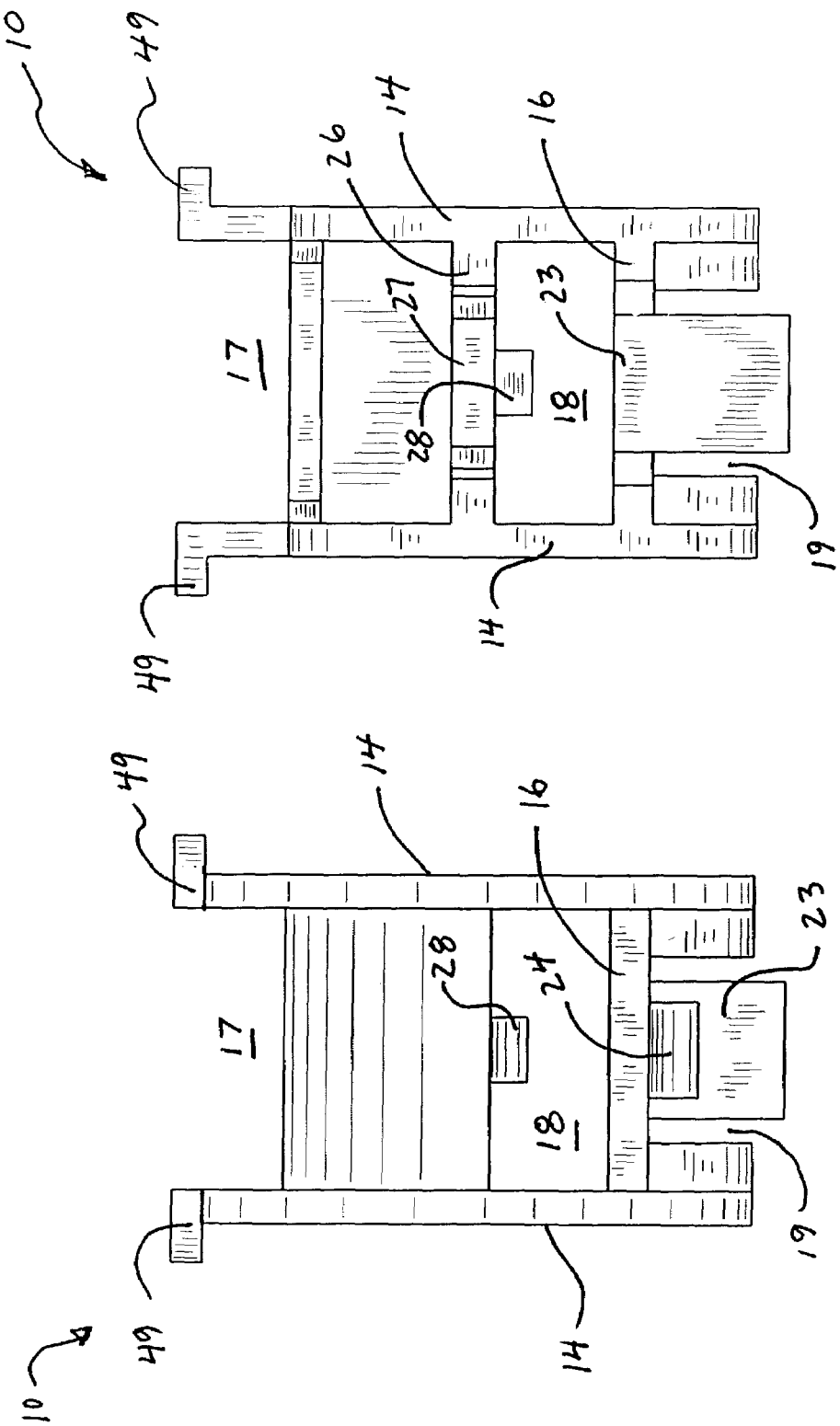

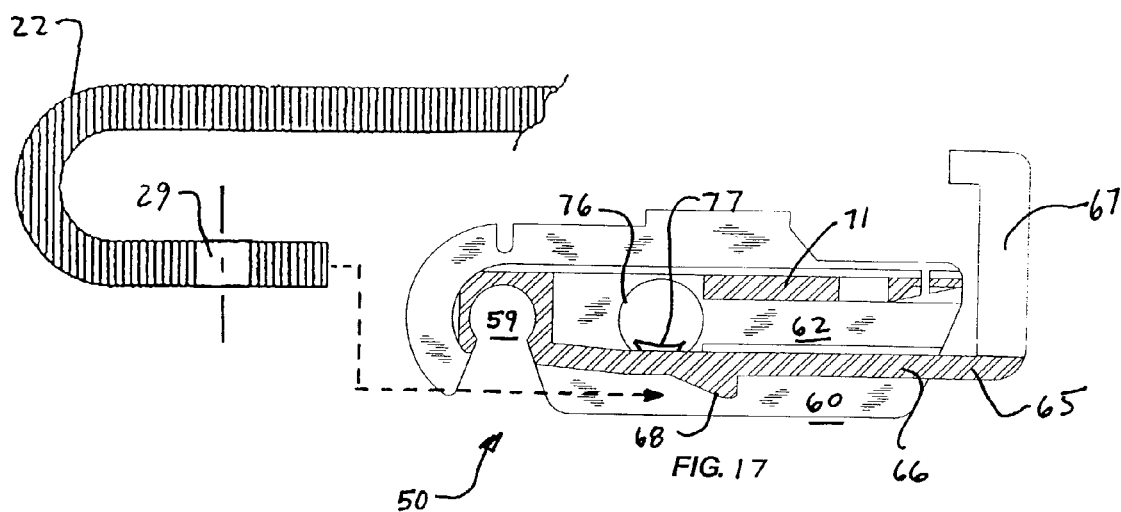
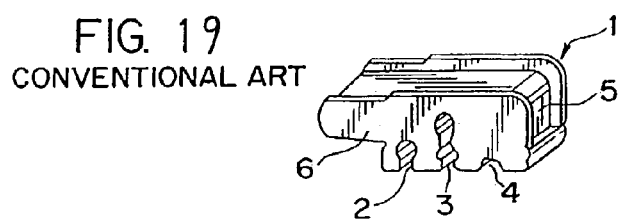
FIG. 19
CONVENTIONAL ART
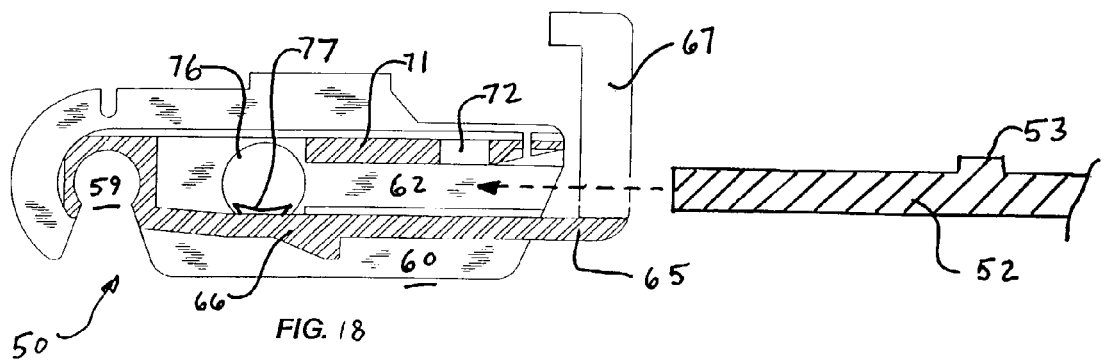

WINDSHIELD WIPER FRAME CONNECTOR WHICH ACCOMMODATES DIFFERENT SIZE WIPER ARMS

BACKGROUND OF THE INVENTION

1. Field of the Invention

The present invention relates to a windshield wiper frame connector, which accommodates different size wiper arms. In particular, the present invention is directed to a windshield wiper frame connector which can accommodate at least three different size wiper arms

2. Description of Related Art

Various types of windshield wiper arm and blade unit connectors for a windshield wiper assembly are known. Such windshield wiper frame connectors include a pair of apertured ears pivotally connected to a pin of a pin type arm as shown in U.S. Pat. No. 3,425,089 and U.S. Pat. No. 3,780,395 to Quinlan et al. However, such conventional art wiper frame connectors are costly to manufacture and are difficult to assemble with the wiper arm and the blade unit due to their complicated structure. Furthermore, such connectors are incapable of receiving the widely used hook type arm of the windshield wiper assembly, which restricts their use in many applicable circumstances.

Conventionally, the windshield wiper frame connector 1 as shown in FIG. 19 is equipped with first, second, and third slots 2, 3, and 4 and an L-shaped recess 5 for receiving both a hook type arm and a pin type arm. However, the windshield wiper frame connector 1 suffers from a number of problems. For example, the difference in depth between the first slot 2 of a pin of the blade unit and the second slot 3 of a roller bushing of the pin type arm causes instability when the pin type arm is connected to the wiper frame connector 1. Moreover, when the connector receives a hook type wiper arm, the connector 1 lacks any locking members that would securely lock the hook type arm to the wiper frame connector 1. The body 6 of the wiper frame connector 1 also uses much material and is heavy in weight. These characteristics and above stated problems are disadvantages in achieving an efficient and economical windshield wiper assembly.

In order to avoid such problems, U.S. Pat. No. 5,289,608, discloses a windshield wiper frame connector for use in a windshield wiper assembly for motor vehicles which includes a pair of slots, two pair of raised portions, and a pair of stoppers on a pair of sidewalls for forming two pairs of spaces, upper and lower elongated seats, and an angled slot and a hole, whereby a hook type wiper arm, or a pin type wiper arm, or a bayonet type wiper arm can be easily connected to a blade.

In addition, U.S. Pat. No. 5,611,103 discloses a windshield wiper frame connector for use in a windshield wiper assembly for motor vehicles, which accommodates different size wiper arms. In particular, the windshield wiper frame connector is capable of connecting a hook type wiper arm, a pin type wiper arm, or a bayonet type wiper to a blade unit.

In the above patent; however, a pivotable clip is required to hold the wiper arm in place. In addition, it is difficult to remove the wiper arm from the connector, since the clip may interfere with the blade unit when the clip is opened.

SUMMARY OF THE INVENTION

Accordingly, it is an object of the present invention to provide an improved windshield wiper frame connector for use in a windshield wiper assembly for motor vehicles, which eliminates the above problems encountered with conventional windshield wiper frame connectors.

It is another object of the present invention to provide an improved windshield wiper frame connector which is capable of receiving two different size hook type wiper arms and a pin type wiper arm in a secure manner.

It is yet another object of the present invention to provide an improved windshield wiper frame connector, which includes a pivotable lever for removably mounting a hook type wiper arm and a pin type wiper arm.

It is a further object of the present invention to provide an improved windshield wiper frame connector, which includes two pivotable levers. A first pivotable lever is provided for removably mounting a first hook type wiper arm and a pin type wiper arm. A second pivotable lever is provided for removably mounting a second hook type wiper arm.

It is an additional object of the present invention to provide an improved windshield wiper frame connector having a pivotable lever having at least one vertical portion extending to an upper portion of the windshield wiper frame assembly to allow for manipulation of the lever from an upper surface of the windshield wiper frame connector.

The above objects are accomplished by a windshield wiper frame connector for connecting a wiper blade unit to a wiper arm, comprising:

an elongated body member defining a longitudinal axis therealong, said body member having a pair of opposing sidewalls, defining opposing inner surfaces;

a connecting slot disposed in a lower portion of said body member for rotatably receiving a transverse pin of a wiper blade unit;

a hole formed in each of said pair of opposing side walls for rotatably receiving a pin of a pin type wiper arm;

an upper jam portion disposed on a top portion of said body member for tightly and smoothly receiving a hook type wiper member;

at least one space disposed in said body member, said at least one space for tightly receiving outer surfaces of a first hook type wiper arm; and a pivotable lever for removably engaging the pin of the pin type wiper arm.

Further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 2 is a right side view of FIG. 1;

FIG. 3 is a left side view of FIG. 1;

FIG. 17 is an explanatory view of the windshield wiper frame connector of the present invention with a hook type wiper arm;

FIG. 18 is an explanatory view of the windshield wiper frame connector of the present invention with a bayonet type wiper arm; and FIG. 19 is a perspective view of a windshield wiper frame connector according to the conventional art.

DETAILED DESCRIPTION OF THE PREFERRED EMBODIMENTS

Figure 1:
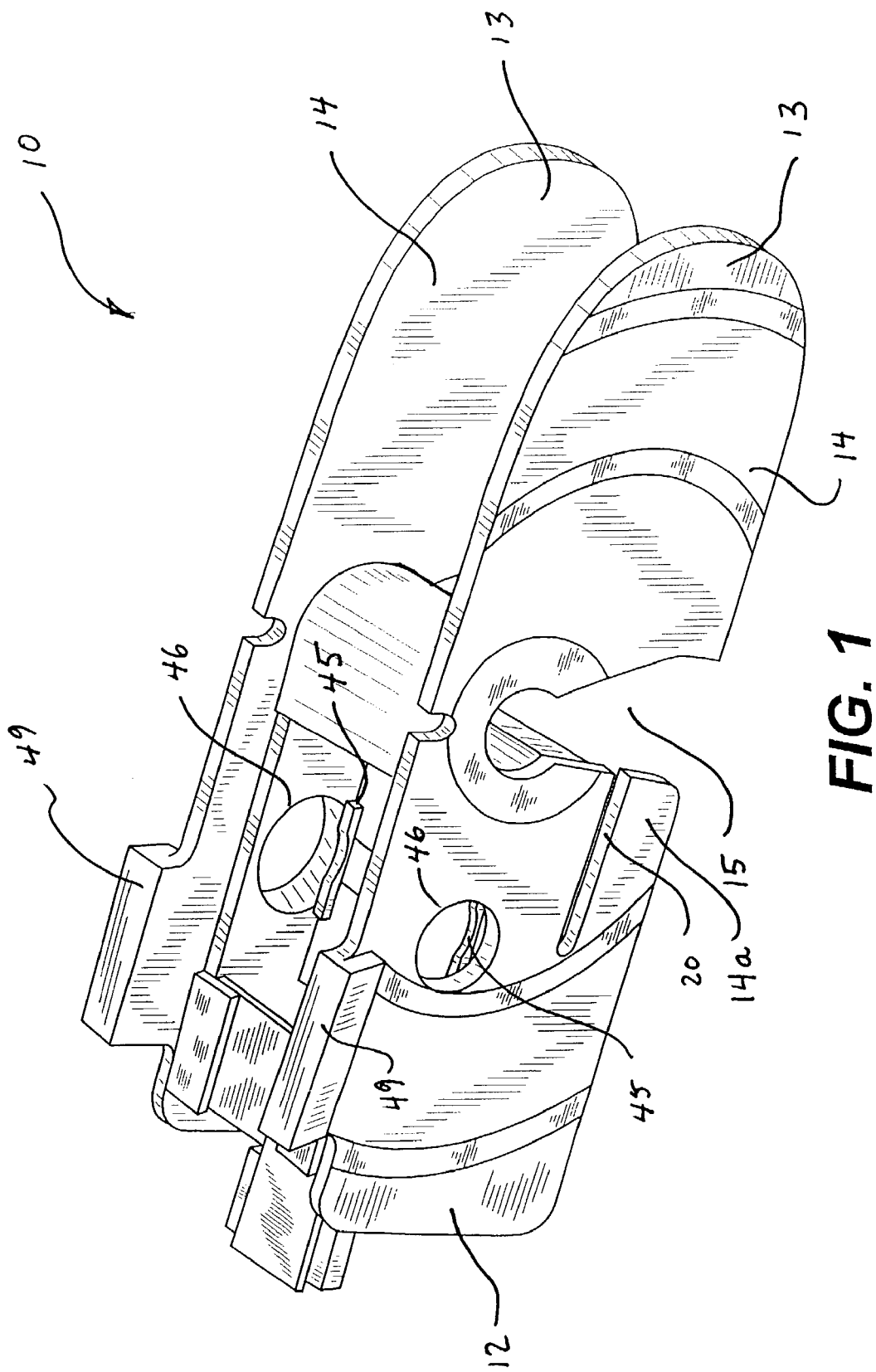
FIG. 1 is a perspective view of a windshield wiper frame connector according to a first embodiment of the present invention.
Figure 4:
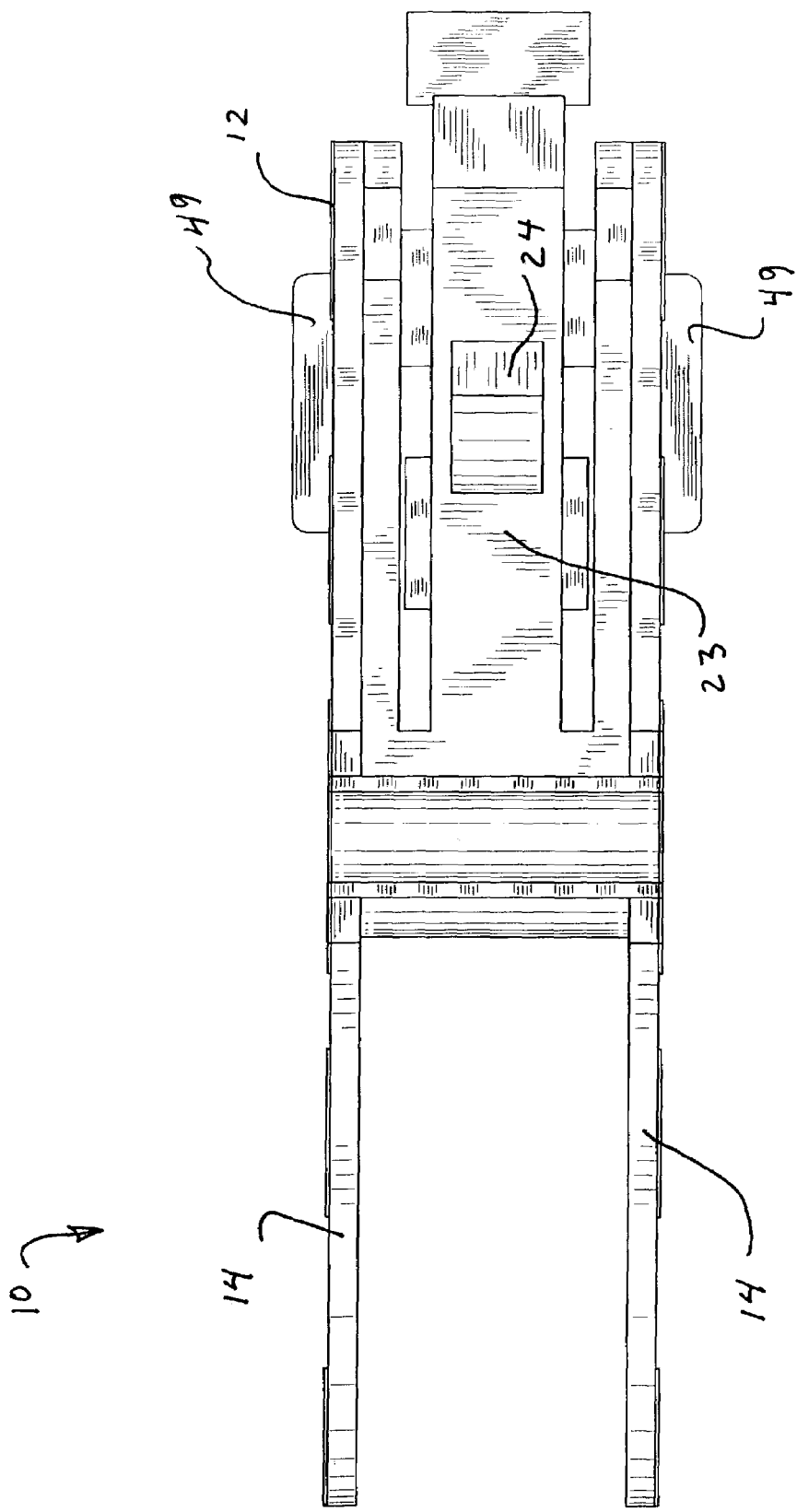
FIG. 4 is a bottom view of FIG. 1.
Figure 5:
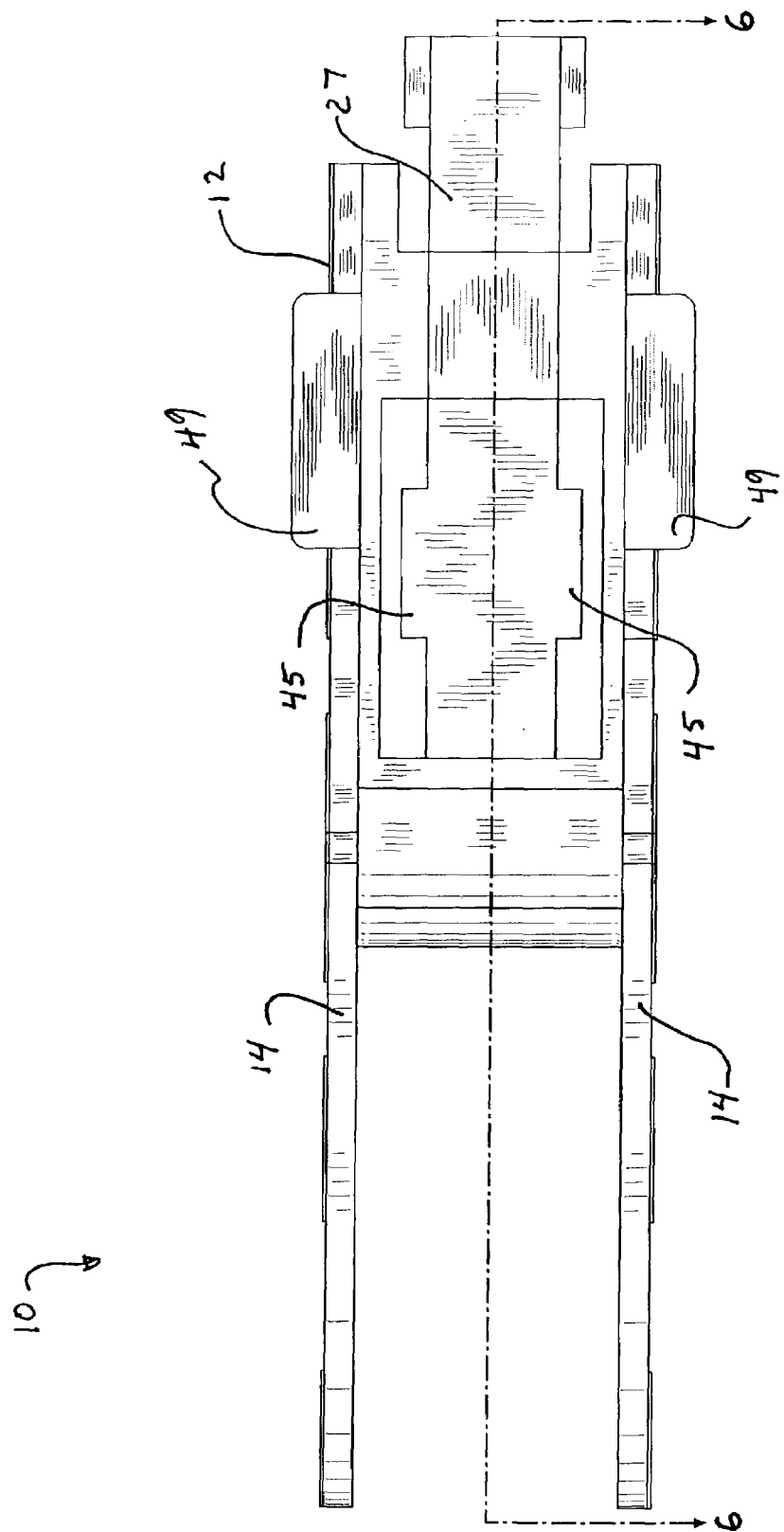
FIG. 5 is a top view of FIG. 1.
Figure 6:
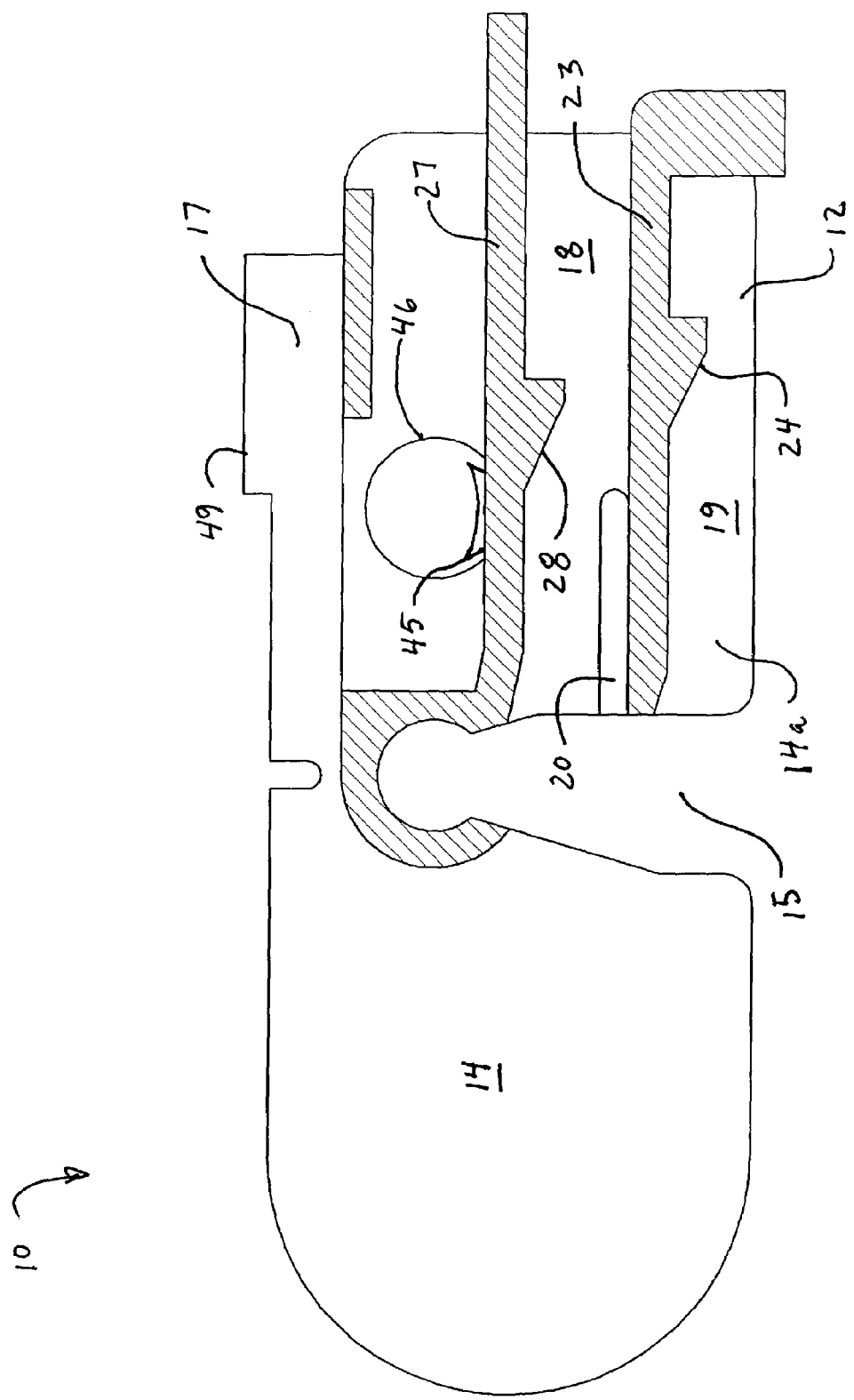
FIG. 6 is a cross-sectional view along the line 6—6 of FIG. 5.

Referring now in detail to the accompanying drawings, the preferred embodiments of the present invention will be described. The windshield wiper frame connector 10 according to a first embodiment of the present invention is designed to be connected to hook type wiper arms 21 and 22 or a pin type wiper arm 40, and a blade unit 30 for use in a windshield wiper assembly of an automobile as shown in FIGS. 7–10. The windshield wiper frame connector 10 comprises a body member 12, a pair of sidewalls 14 each having a front wing portion 13. A blade unit connecting slot 15 is disposed in the lower portion of the body member 12 in order to receive a transverse pin 36 of the blade unit 30 (see FIG. 7).

An upper jam portion 17 is disposed on the top of the body member 12. A lower space 19 and an upper space 18 are disposed in the body member 12 for receiving a first hook type wiper arm 21 and a second hook type wiper arm 22, respectively. The first hook type wiper arm 21 can be, for example, a wiper arm for use in European automobiles and trucks. A wiper arm for a European automobile or truck typically has a 9 mm width, 11 mm diameter and 4 mm thickness (see FIG. 8). The second hook type wiper arm 22 can be, for example, a wiper arm for use in other automobiles, which has a 9 mm width, 8.4 mm diameter and 3 mm thickness (see FIG. 9). However, it should be understood to one having ordinary skill in the art that the windshield wiper frame connector 10 of the present invention is not limited to such wiper arms. All that is necessary is for the windshield wiper frame connector 10 to be dimensioned such that two different size hook type wiper arms can be received and held within the upper and lower spaces 18 and 19.

The lower space 19 and the upper space 18 are separated from each other by a horizontal dividing wall 16. A first lever 23 is pivotally mounted to the horizontal dividing wall 16. The first lever 23 includes a detent 24, which is engageable with an aperture 25 of the first hook type wiper arm 21 (see FIG. 8). In addition, a horizontal wall 26 forms an upper ceiling of the upper space 18. A second lever 27 is pivotally mounted to the horizontal wall 26 and includes a detent 28, which is engageable with an aperture 29 of the second hook type wiper arm 22 (see FIG. 9).

Figure 8:
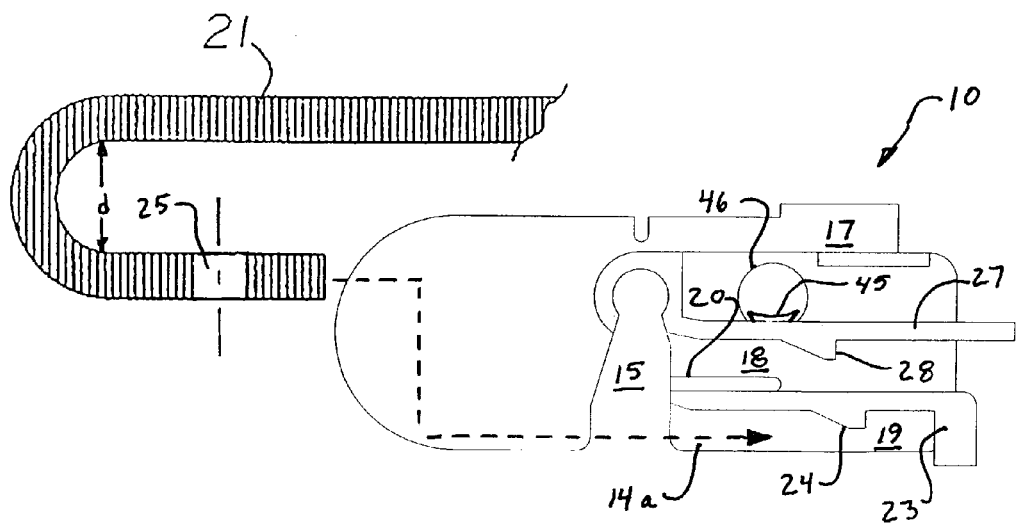
FIG. 8 is an explanatory view of the windshield wiper frame connector of the present invention with a first size hook type wiper arm.

As shown in FIG. 8, an upper arm of the first hook type wiper arm 21 engages with the upper jam portion 17 and a lower arm of the first hook type wiper arm 21 inserts into the lower space 19 (see the arrow in FIG. 8). The detent 24 is receivable within the aperture 25 in order to secure the first hook type wiper arm 21 to the windshield wiper frame connector 10 in a secure manner. In order to release the first hook type wiper arm 21 from engagement with the windshield wiper frame connector 10, it is merely necessary to pivot the first lever 23 upwardly to disengage the detent 24 from the aperture 25. The first hook type wiper arm 21 can then be slid in a direction opposite to the direction of the arrow in FIG. 8.

Figure 9:
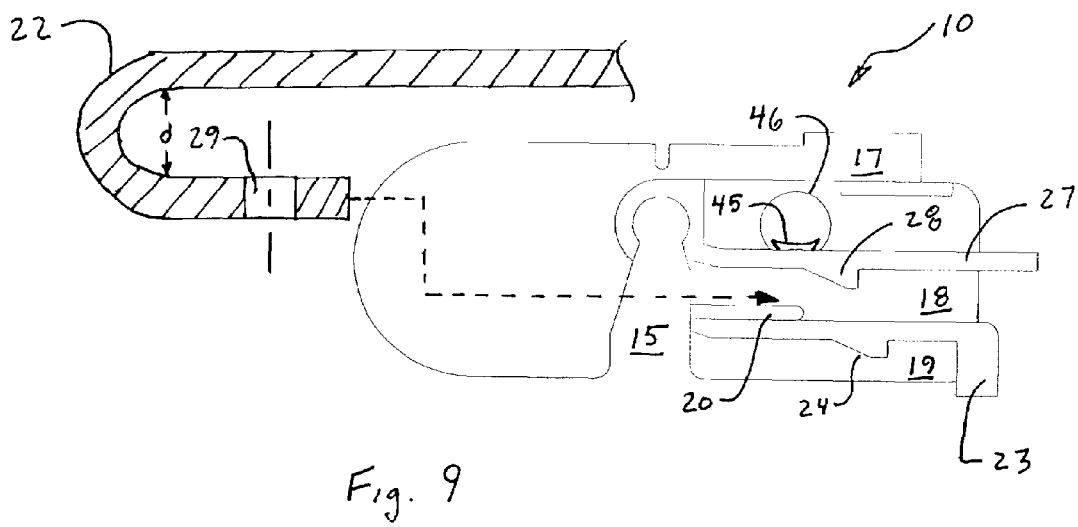
FIG. 9 is an explanatory view of the windshield wiper frame connector of the present invention with a second size hook type wiper arm.

Referring to FIG. 9, the upper arm of the second hook type wiper arm 22 engages with the upper jam portion 17 and the lower arm of the second hook type wiper arm 22 inserts into the upper space 18 (see the arrow in FIG. 9). The detent 28 is receivable with the aperture 29 in order to secure the second hook type wiper arm 22 to the windshield wiper frame connector 10 in a secure manner. In order to release the second hook type wiper arm 22 from engagement with the windshield wiper frame connector 10, it is merely necessary to pivot the second lever 27 upwardly to disengage the detent 28 from the aperture 29. The second hook type wiper arm 22 can then be slid in a direction opposite to the direction of the arrow in FIG. 9.

Referring to FIGS. 1, 8 and 9, a horizontal slot 20 is formed in each of the side walls 14 at a location above the first lever 23 and the horizontal dividing wall 16. Referring to FIG. 1, the horizontal slot 20 forms a separated portion 14a in each of the of the side walls 14. The horizontal slot 20 provides flexibility to the separated portion 14a in order to aid in the insertion of the lower arm of the first and second hook type wiper arms 21 and 22. Specifically, referring to FIG. 8, the horizontal slot 20 allows the separated portion 14a of the side wall 14 to flex to close the horizontal slot 20 slightly. This flexing raises the horizontal dividing wall 16 and therefore the first lever 23 in order to increase the size of the space 19. This enables the first hook type wiper arm 21 to be easily inserted into the lower space 19. Furthermore, referring to FIG. 9, the horizontal slot 20 also allows the separated portion 14a of the wall 14 to flex to open the horizontal slot 20 slightly. In this case, the flexing lowers the horizontal dividing wall 16 and therefore the first lever 23 in order to increase the size of the opening of the upper space 18 to enable easy insertion of the second hook type wiper arm 22.

The provision of the horizontal slot 14 increases the number of applications that a particular windshield wiper frame connector 10 can be used for. Specifically, the horizontal slot 14 makes up for manufacturing tolerances of the hook type wiper arms 21, 22. During manufacture of the hook type wiper arms 21, 22, the inside diameter d (see FIGS. 7 and 8) of the hook type wiper arms 21, 22 can vary greatly. For example, a hook type wiper arm, which is intended to have an inside diameter d=10 mm may be actually manufactured to, for example, d=9.5 mm. In the connectors according to the background art, if a hook type wiper arm of d=9.5 mm was used with a connector made for a d=10 mm connector, the connector would not work. However, in the present invention, the horizontal slot 20 allows the space 19 be increased in size in order to accommodate a hook type wiper arm 21, 22 having a inside diameter d=9.5 mm.

Figure 7:
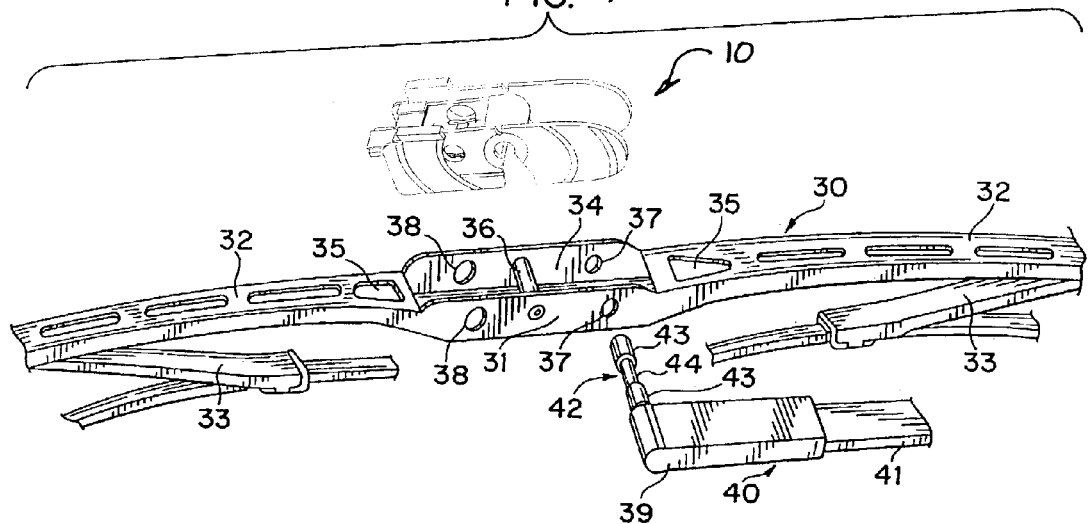
FIG. 7 is an exploded, perspective view of the windshield wiper frame connector of the present invention in combination with a blade unit having two pairs of different size apertures and a pin type wiper arm.

As shown in FIG. 7, the wiper blade unit 30 includes a bridge member 31, a pair of primary yokes 32 connected to the bridge member 31 and a pair of secondary yokes 33 each pivotally connected to one end of the respective primary yoke 32. Ends of the pair of secondary yokes 33 and the other end of the pair of primary yokes 31 are provided with a claw 34. The bridge member 31 includes the opening 35, a transverse pin 36, and a pair of first pin apertures 37 and a pair of second pin apertures 38. The first and second pin apertures 37, 38 typically have a diameter of approximately 4.8 mm and 6.4 mm, respectively, for slidably receiving 3/16 inch and 1/4 inch diameter pin type arms 40.

Also, referring in detail to FIG. 7, there is illustrated the windshield wiper frame connector 10 of the present invention and the pin type wiper arm 40. The pin type wiper arm 40 includes a pin holder 39 with an arm body 41, pin 42 having a pair of rolled bushings 43 and a reduced portion 44 for rotatably contacting a pair of arc-shaped raised surfaces 45 formed on an upper surface of the second lever 27 of the wiper frame connector 10 (see FIG. 10). The pin 42 is received through a pair of holes 46 formed in the side walls 14. At this time, the reduced portion 44 of the pin 42 of the pin type wiper arm 40 can be tightly locked with the arc-shaped raised surfaces 45. In order to detach the pin type wiper arm 40 from the windshield wiper frame connector 10, it is merely necessary to pivot the second lever 27 downwardly to disengage the arc shaped raised surfaces 45 from the reduced portion 44 and pull the pin 42 out of the holes 46.

Also, the pair of rolled bushings 43 is rotatably inserted into the pair of first pin apertures 37 or second pin apertures 38, depending on the size of the pin 42. Specifically, if the pin 42 is a 3/16 inch pin, a windshield wiper frame connector 10 having a 3/16 inch hole 46 is used and the hole 37 in the blade unit 30 is used to receive the pin 42. However, if the pin 42 is a 1/4 inch pin, a windshield wiper frame connector 10 having a 1/4 inch hole 46 is used and the hole 38 in the blade unit 30 is used to receive the pin 42. It should also be noted that the pair of rolled bushings 43 are also supported by the holes 46 formed in the windshield wiper frame connector 10, which are located immediately inside of the holes 37, 38 when the windshield wiper frame connector 10 is mounted to the blade unit 30.

Figure 10:
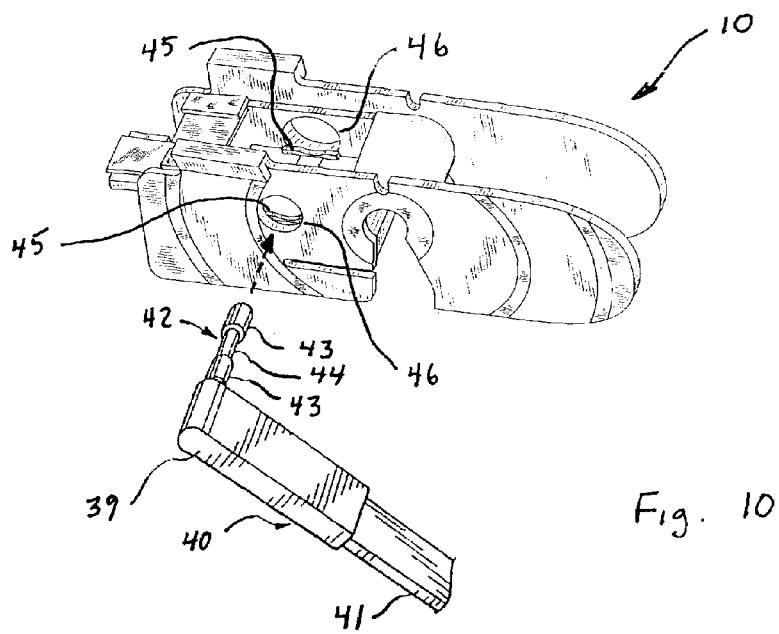
FIG. 10 is an explanatory view of the windshield wiper frame connector of the present invention with a pin type wiper arm.

Referring to FIGS. 7 and 10, the windshield wiper frame connector 10 also includes a stopper 49 located on each of the side walls 14. The stoppers 49 are located such that a bottom horizontal surface of the stoppers 49 are located in engagement and parallel to an uppermost surface of the claw 34 of the blade unit 30 when the windshield wiper frame connector 10 is attached to the blade unit 30. When the stoppers 49 are in this position, the pin apertures 37, 38 of the blade unit 30 and the holes 46 in the side walls 14 are in alignment. Accordingly, the pin 42 of the pin type wiper arm 40 can be easily inserted into the pin apertures 37, 38 and the holes 46. In addition, the stoppers 49 can be pushed downwardly into engagement with the uppermost surface of the claw 34 when the pin 42 of the pin type wiper arm is to be removed in order to ensure that the pin apertures 37, 38 and the holes 46 are properly aligned to allow for easy removal of the pin 42 from the apertures 37, 38 and the holes 46.

Accordingly, the wiper frame connector 10 of the present invention can be easily used as an adapter for the blade unit 30 to connect to the hook type wiper arm 21, 22, or the pin type wiper arm 40, if necessary. Furthermore, the wiper arms are tightly and securely connected to the blade unit 30 so that the wiper connector 10 of the present invention achieves an effective connecting operation and improves the wiping performance of the windshield wiper assembly as well as its operational lifetime. Finally, the wiper frame connector 10 of the present invention can be easily detached from the wiper arm by merely pivoting one of the first and second levers 23 and 27, depending on the type of wiper arm attached thereto.

Referring to FIGS. 11–18, a second embodiment of the present invention will be described. The windshield wiper frame connector 50 according to the second embodiment of the present invention is designed to be connected to a hook type wiper arm 22, a pin type wiper arm 40 or a bayonet type wiper arm 52, and a blade unit 30 for use in a windshield wiper assembly of an automobile as shown in FIGS. 7, 10, 17 and 18. The windshield wiper frame connector 50 comprises a body member 54 and a pair of sidewalls 56. A blade unit connecting slot 59 is disposed in the lower portion of the body member 54 in order to receive a transverse pin 36 of the blade unit 30 (see FIG. 7).

An upper jam portion 58 is disposed on the top of the body member 54. A lower space 60 and an upper space 62 are disposed in the body member 54 for receiving a hook type wiper arm 22 and a bayonet type wiper arm 52, respectively. The hook type wiper arm 22 can be, for example, a wiper arm for use in European automobiles and trucks or a wiper arm for use in other automobiles. It should be understood to one having ordinary skill in the art that the windshield wiper frame connector 50 of the present invention is not limited to such wiper arms. All that is necessary is for the windshield wiper frame connector 50 to be dimensioned such that a particular hook type wiper arm can be received and held within the lower space 60.

The lower space 60 and the upper space 62 are separated from each other by a horizontal dividing wall 64. A lever 66 is pivotally mounted to the horizontal dividing wall 64. The lever 66 includes a detent 68, which is engageable with an aperture 29 of the hook type wiper arm 22 (see FIG. 17). In addition, a horizontal wall 70 forms an upper ceiling of the upper space 62, and divides the upper space 62 from the upper jam portion 58. The horizontal wall 70 includes a pivotable flap 71 with an aperture 72 formed therethrough for receiving a pin 53 of the bayonet type wiper arm as will be explained below. The flap 71 is separated from the side walls 56 by spaces 73 and from a front portion 75 of the horizontal wall 70 by a space 74. This enables the flap 71 to pivot up and down as illustrated by the arrow in FIG. 16.

As shown in FIG. 17, an upper arm of the hook type wiper arm 22 engages with the upper jam portion 58 and a lower arm of the hook type wiper arm 22 inserts into the lower space 60 (see the arrow in FIG. 17). The detent 68 is receivable within the aperture 29 in order to secure the hook type wiper arm 22 to the windshield wiper frame connector 50 in a secure manner. In order to release the hook type wiper arm 22 from engagement with the windshield wiper frame connector 50, it is merely necessary to pivot the lever 66 upwardly to disengage the detent 68 from the aperture 29. The hook type wiper arm 22 can then be slid in a direction opposite to the direction of the arrow in FIG. 17.

Referring to FIG. 18, the bayonet type wiper arm 52 is inserted in the direction of the arrow in FIG. 18 to be received within the upper space 62. The bayonet type wiper arm 52 is inserted until the pin 53 engages into the aperture 72, which is formed in the flap 71 of the horizontal wall 70 in order to secure the bayonet type wiper arm 52 to the windshield wiper frame connector 50 in a secure manner. During the insertion of the bayonet type wiper arm 52, the flap 71 pivots upwardly to enable the pin 53 to enter the aperture 72 and then pivots downwardly to secure the pin 53 within the upper space 62.

In order to release the bayonet type wiper arm 52 from engagement with the windshield wiper frame connector 50, it is merely necessary to pivot the flap 71 upwardly to disengage the pin 53 from the aperture 72. The bayonet type wiper arm 52 can then be slid in a direction opposite to the direction of the arrow in FIG. 18. In this case, the flap 71 can be aided to pivot upwardly by inserting a tool into the space 74 between the front portion 75 of the horizontal wall 70 and the flap 71. Pushing downwardly on the bayonet type wiper arm 52 will also help to remove the bayonet type wiper arm 52, since this action will flex the horizontal dividing wall 64 downwardly to increase the size of the upper space 62 to allow the pin 53 to disengage the aperture 72.

Figure 16:
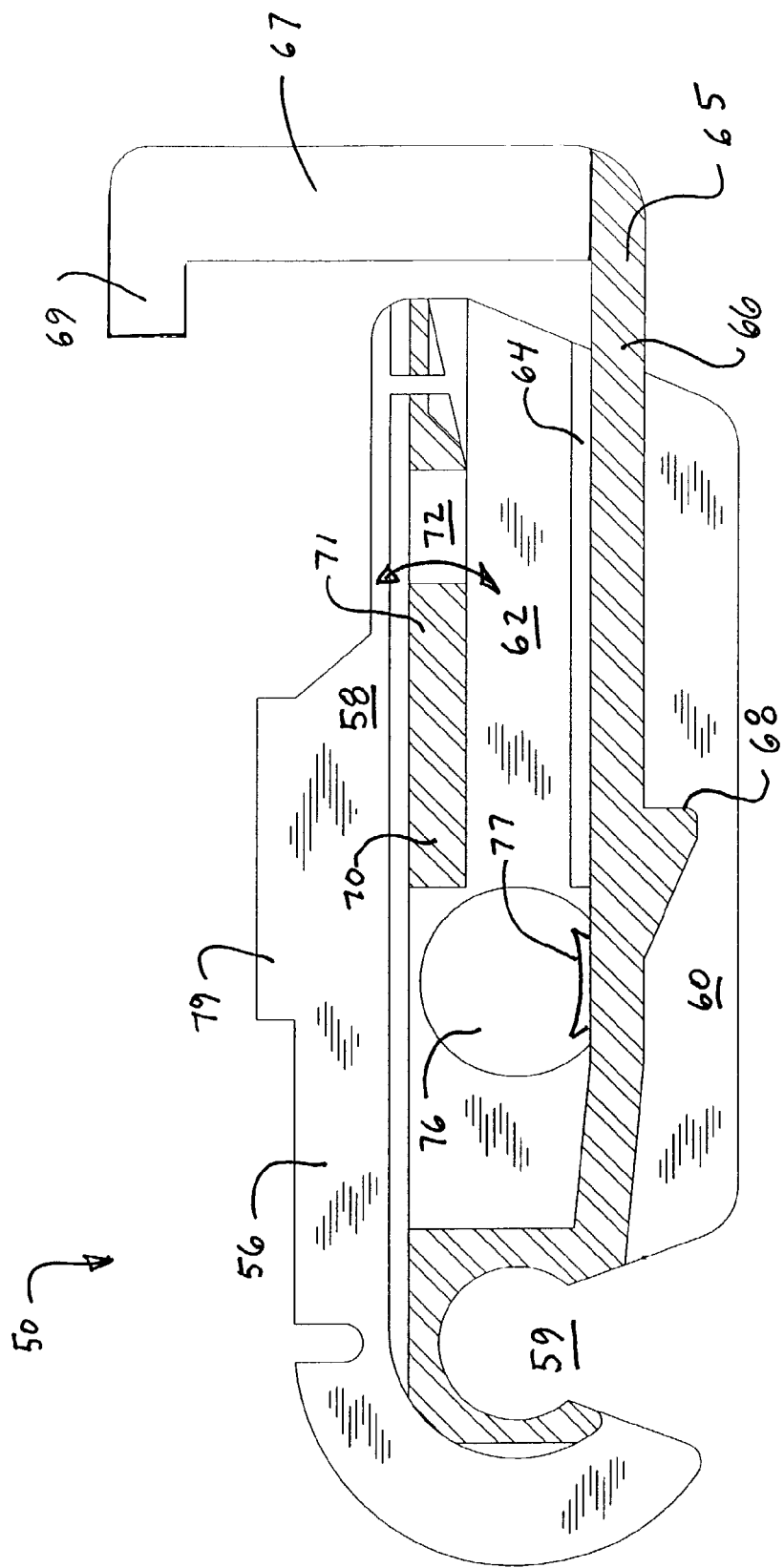
FIG. 16 is a cross-sectional view along the line 12—12 of FIG. 14.

Referring in detail to FIG. 16, the windshield wiper frame connector 50 also includes a hole 76 formed in each of the side walls 56. In addition, the lever 66 includes an arc shaped raised surface 77 formed on a top thereof and each of the side walls includes a stopper 79 on a top surface thereof. The holes 76, the arc shaped raised surface 77 and the stoppers 79 function in the same manner described above with regard to the corresponding elements of the first embodiment of the present invention and illustrated in FIGS. 7 and 10 to receive a pin type wiper arm 40. In view of this, connection of the windshield wiper frame connector 50, the blade unit 30 and the pin type wiper arm 40 will not be further described.

Figure 11:
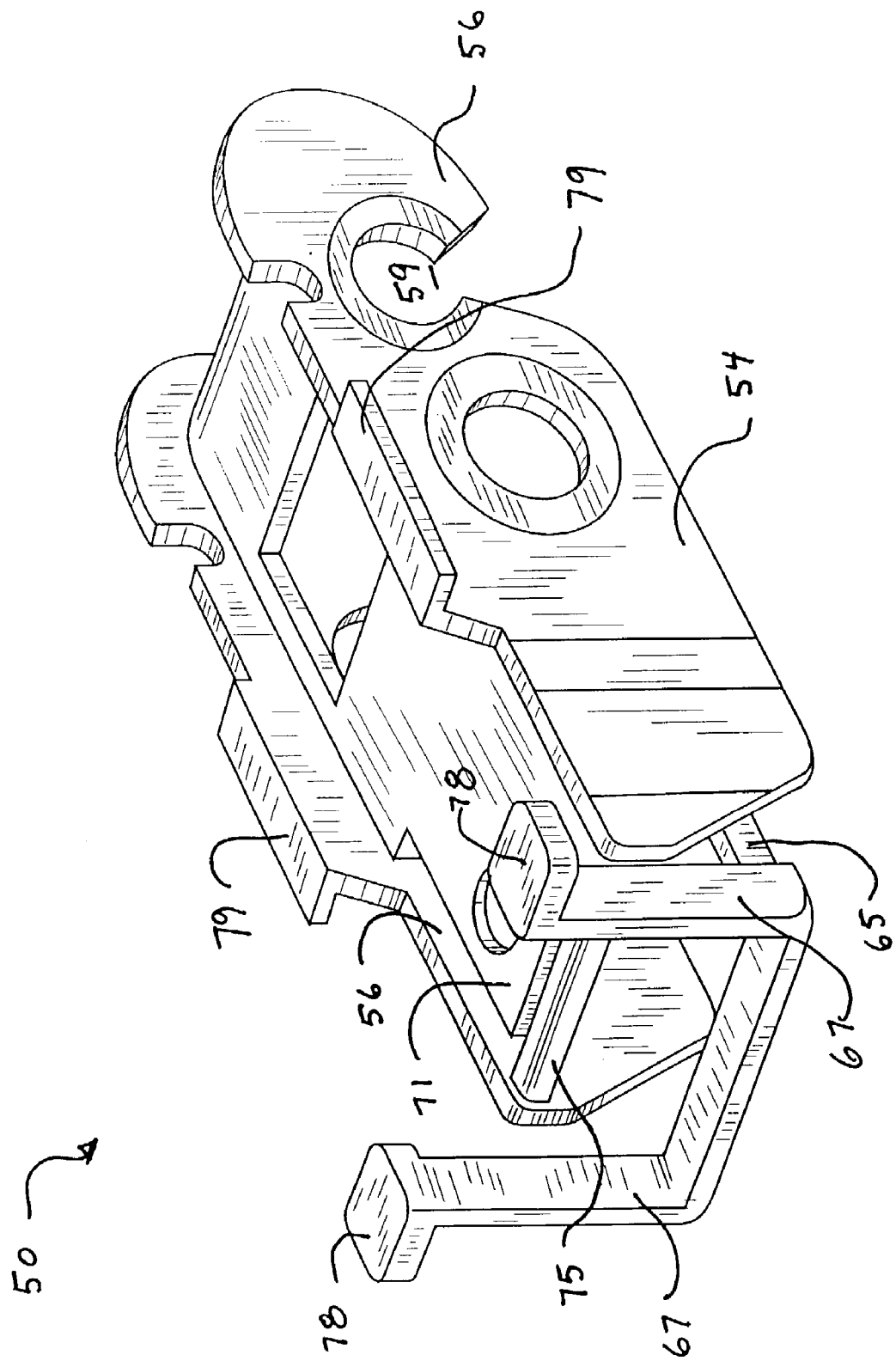
FIG. 11 is a perspective view of a windshield wiper frame connector according to a second embodiment of the present invention.
Figure 12:
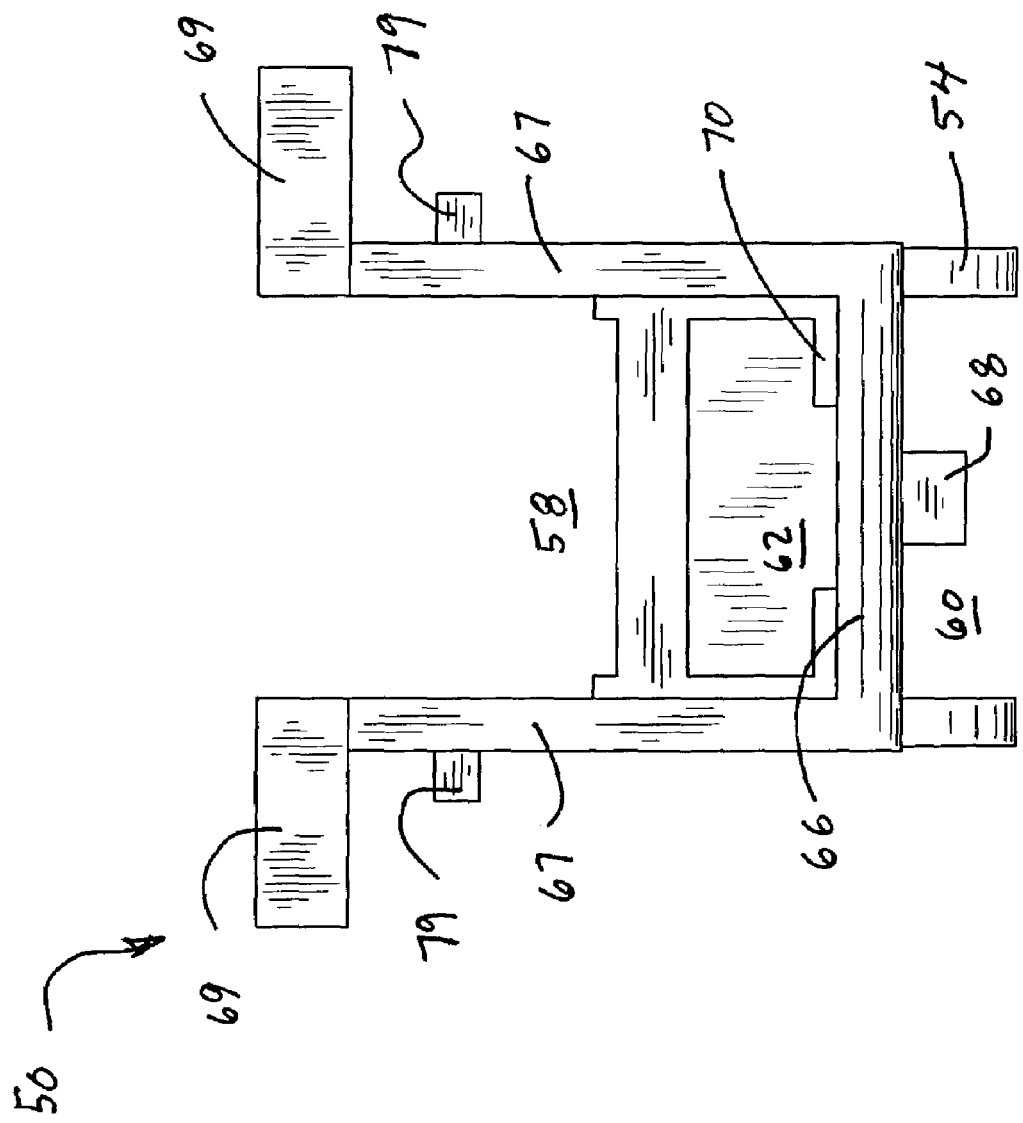
FIG. 12 is a left side view of FIG. 11.
Figure 13:
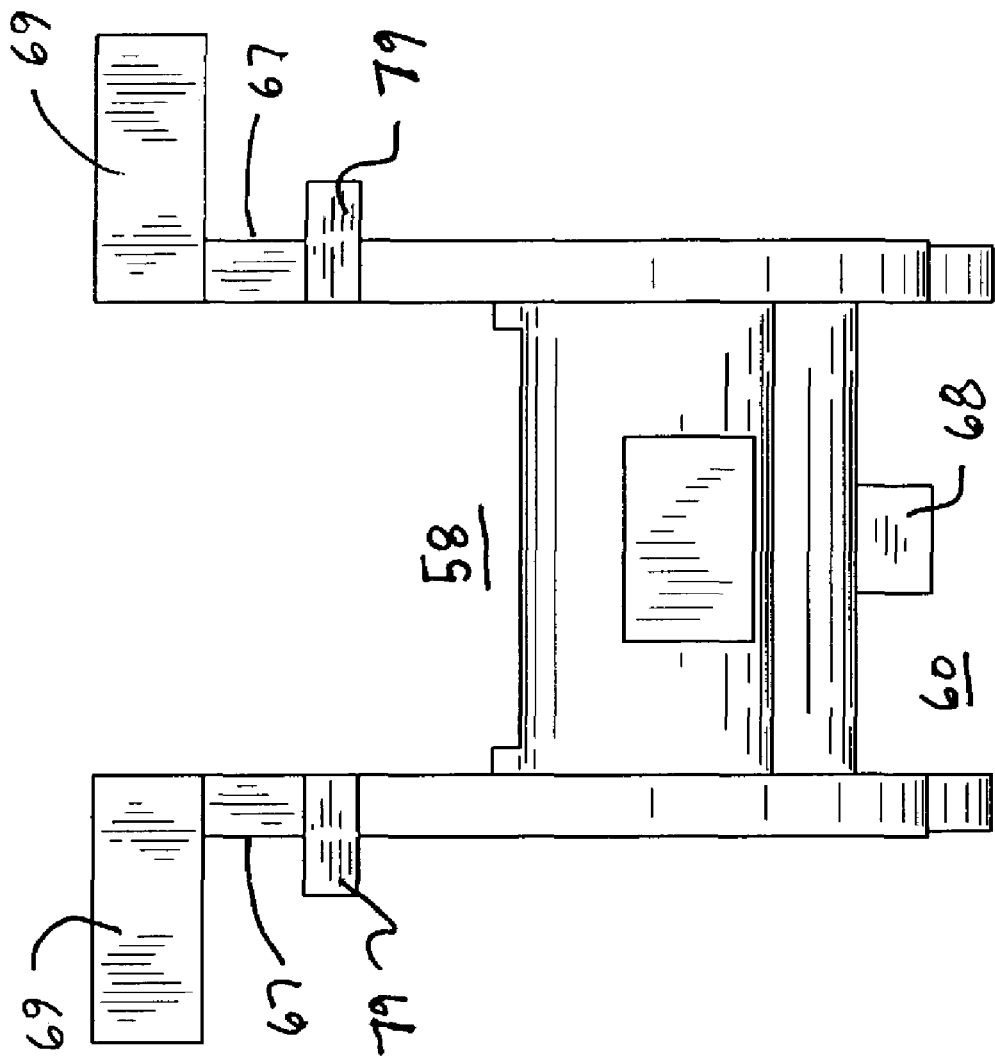
FIG. 13 is a right side view of FIG. 11.
Figure 14:
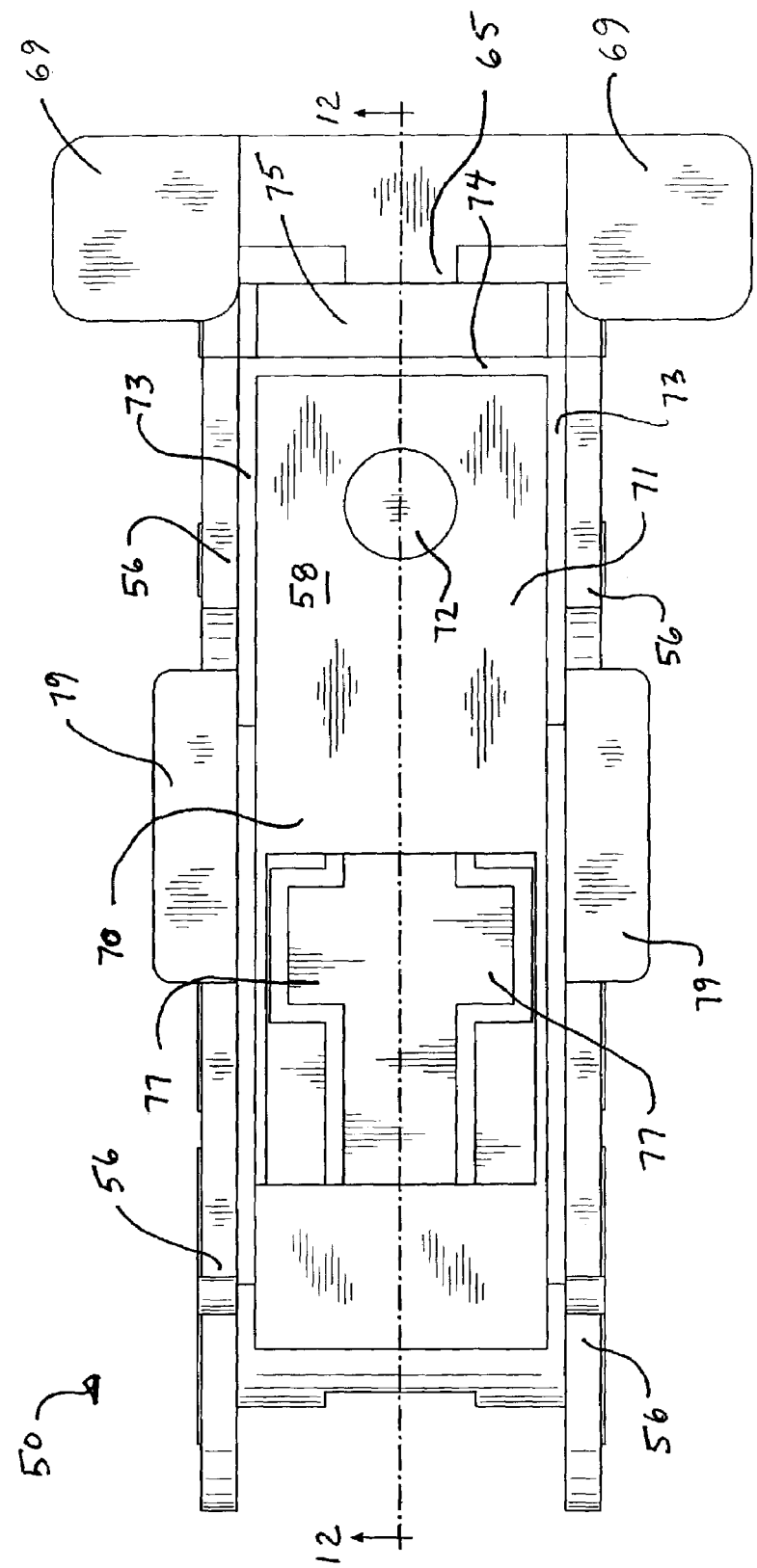
FIG. 14 is a top view of FIG. 11.
Figure 15:
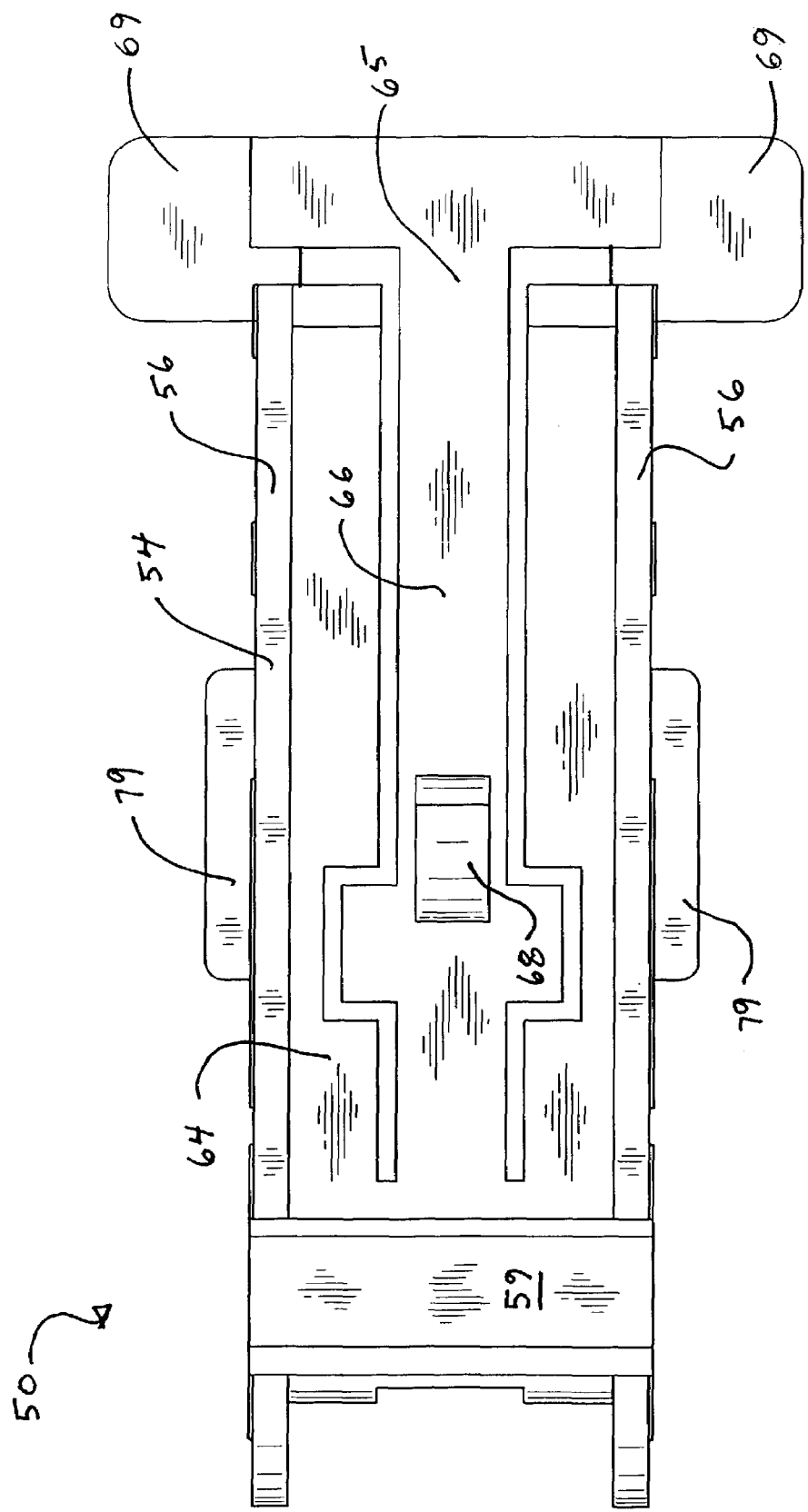
FIG. 15 is a bottom view of FIG. 11.

Referring to FIGS. 11 and 16, the lever 66 includes a horizontal portion 65 and two vertical arms 67. The vertical arms 67 enable the lever 66 to be pivoted from above the windshield wiper frame connector 50. When the windshield wiper frame connector 50 is secured to the blade unit 30 with the blade unit connecting slot 59, especially in a winter blade unit, there is a limited amount of space to pivot the windshield wiper frame connector 50 to gain access to the lever 66 to pivot the lever 66 upwardly to remove the hook type wiper arm 22. In addition, when the windshield wiper frame connector 50 is attached to a pin type wiper arm 40, the windshield wiper frame connector 50 cannot be pivoted upwardly about the transverse pin 36 of the blade unit 30. This is due to the fact that the pin 42, which is secured through the one of the pair of pin apertures 37, 38 and the holes 76 prevent rotation of the windshield wiper frame connector 50. The vertical arms 76 allow the lever 66 to be manipulated from a position above the windshield wiper frame connector 50 when in a non-rotated manner on the blade unit 30.

Referring again to FIG. 11, the vertical arms 67 can include pressing members 69 formed at a top thereof in order to help in the manipulation of the lever 66. It is also possible to include only one vertical arm 67, as long as it is not located to interfere with the insertion of the bayonet type wiper arm 52. However, two vertical levers are preferred in order to provide a balanced force to the lever 66.

As will be understood to one having ordinary skill in the art, in the first embodiment of the present invention, the pin type wiper arm 40 also prevents the rotation of the windshield wiper frame connector 10. However, in the first embodiment, the second lever 27 is located at a higher position when attached to the blade unit 30 than the lever 66 in the windshield wiper frame connector 50 of the second embodiment. In view of this, it is unnecessary to include vertical arms on the second lever 27 of the windshield wiper frame connector 10 of the first embodiment. However, it should be understood that it is possible to include vertical arms on the windshield wiper frame connector 10 if desired or necessary.

In view of the above, the wiper frame connector 50 of the present invention can be easily used as an adapter for the blade unit 30 to connect to the hook type wiper arm 22, the pin type wiper arm 40 or the bayonet type wiper arm 52. Furthermore, the wiper arms are tightly and securely connected to the blade unit 30 so that the wiper connector 50 of the present invention achieves an effective connecting operation and improves the wiping performance of the windshield wiper assembly as well as its operational lifetime. The wiper frame connector 50 of the present invention can be easily detached from the wiper arm by merely pivoting the lever 66 upwardly in the case of the hook type wiper arm 22 or downwardly in the case of the pin type wiper arm 40, depending on the type of wiper arm attached to the windshield wiper frame connector 50. Finally, the windshield wiper frame connector 50 of the present invention can be easily detached from a bayonet type wiper arm 52 by pivoting the flap 71 upwardly to disengage the pin 53 from the aperture 72.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A windshield wiper frame connector for connecting a wiper blade unit to a wiper arm, comprising:
   an elongated body member defining a longitudinal axis therealong, said body member having a pair of opposing sidewalls, defining opposing inner surfaces;
   a connecting slot disposed in a lower portion of said body member for rotatably receiving a transverse pin of a wiper blade unit;
   a hole formed in each of said pair of opposing side walls for rotatably receiving a pin of a pin type wiper arm;
   an upper jam portion disposed on a top portion of said body member for tightly and smoothly receiving a hook type wiper member;
   at least one space disposed in said body member, said at least one space for tightly receiving outer surfaces of a first hook type wiper arm; and
   a pivotable lever for removably engaging the pin of the pin type wiper arm,
   wherein there are two of said at least one space, said pivotable lever is located above an upper one of said two spaces, said windshield wiper frame connector further comprising a second pivotable lever, said second pivotable lever including a detent on a lower surface thereof for removably engaging an aperture of a second hook type wiper arm.

2. The windshield wiper frame connector according to claim 1, wherein said opposing side walls include a slot, respectively formed therein at a location between said upper and a lower of said at least one space, said slot providing flexibility to said opposing side walls to vary the size of the upper and lower spaces to aid in the insertion and removal of the first and second hook type wiper arms.

3. The windshield wiper frame connector according to claim 1, wherein each of said side walls includes a slot formed therein at a location between said two spaces, each of said slots forming a movable portion of said side walls for increasing or decreasing a size of said two spaces.

4. A windshield wiper frame connector for connecting a wiper blade unit to a wiper arm, compnsing:
- an elongated body member defining a longitudinal axis therealong, said body member having a pair of opposing sidewalls, defining opposing inner surfaces;
- a connecting slot disposed in a lower portion of said body member for rotatably receiving a transverse pin of a wiper blade unit;
- a hole formed in each of said pair of opposing side walls for rotatably receiving a pin of a pin type wiper arm;
- an upper jam portion disposed on a top portion of said body member for tightly and smoothly receiving a hook type wiper member;
- at least one space disposed in said body member, said at least one space for tightly receiving outer surfaces of a first hook type wiper arm; and
- a pivotable lever for removably engaging the pin of the pin type wiper arm, said pivotable lever including an upper surface having a raised, arc-shaped detent formed thereon, said raised, arc-shaped detent for directly engaging a reduced diameter portion of the pin of the pin type wiper arm, wherein said pivotable lever includes said raised, arc-shaped detent on the upper surface thereof for engaging the pin of the pin type wiper arm, and a detent on a lower surface thereof for removably engaging an aperture in the first hook type wiper arm, wherein there are two of said at least one space, said pivotable lever is located above an upper one of said two spaces, said windshield wiper frame connector further comprising a second pivotable lever, said second pivotable lever including a detent on a lower surface thereof for removably engaging an aperture of a second hook type wiper arm.

5. The windshield wiper frame connector according to claim 4, wherein said opposing side walls include a slot, respectively formed therein at a location between said upper and a lower of said at least one space, said slot providing flexibility to said opposing side walls to vary the size of the upper and lower spaces to aid in the insertion and removal of the first and second hook type wiper arms.

6. The windshield wiper frame connector according to claim 4, wherein each of said side walls includes a slot formed therein at a location between said two spaces, each of said slots forming a movable portion of said side walls for increasing or decreasing a size of said two spaces.

7. A windshield wiper frame connector for connecting a wiper blade unit to a wiper arm, comprising:
- an elongated body member defining a longitudinal axis therealong, said body member having a pair of opposing sidewalls, defining opposing inner surfaces;
- a connecting slot disposed in a lower portion of said body member for rotatably receiving a transverse pin of a wiper blade unit;
- a hole formed in each of said pair of opposing side walls for rotatably receiving a pin of a pin type wiper arm;
- an upper jam portion disposed on a top portion of said body member for tightly and smoothly receiving a hook type wiper member;
- at least one space disposed in said body member, said at least one space for tightly receiving outer surfaces of a first hook type wiper arm; and
- a pivotable lever for removably engaging the pin of the pin type wiper arm,
- wherein there are two of said at least one space, said pivotable lever is located between an upper and a lower of said at least one space, said windshield wiper frame connector further comprising a pivotable flap, said pivotable flap including an aperture formed therein for removably engaging a pin of a bayonet type wiper arm.

8. A windshield wiper frame connector for connecting a wiper blade unit to a wiper arm, comprising:
- an elongated body member defining a longitudinal axis therealong, said body member having a pair of opposing sidewalls, defining opposing inner surfaces;
- a connecting slot disposed in a lower portion of said body member for rotatably receiving a transverse pin of a wiper blade unit;
- a hole formed in each of said pair of opposing side walls for rotatably receiving a pin of a pin type wiper arm;
- an upper jam portion disposed on a top portion of said body member for tightly and smoothly receiving a hook type wiper member;
- at least one space disposed in said body member, said at least one space for tightly receiving outer surfaces of a first hook type wiper arm; and
- a pivotable lever for removably engaging the pin of the pin type wiper arm, said pivotable lever including an upper surface having a raised, arc-shaped detent formed thereon, said raised, arc-shaped detent for directly engaging a reduced diameter portion of the pin of the pin type wiper arm, wherein said pivotable lever includes said raised, arc-shaped detent on the upper surface thereof for engaging the pin of the pin type wiper arm, and a detent on a lower surface thereof for removably engaging an aperture in the first hook type wiper arm, wherein there are two of said at least one space, said pivotable lever is located between an upper and a lower of said at least one space, said windshield wiper frame connector further comprising a pivotable flap, said pivotable flap including an aperture formed therein for removably engaging a pin of a bayonet type wiper arm.

\* \* \* \* \*